US006181318B1

United States Patent
Lim

(10) Patent No.: US 6,181,318 B1
(45) Date of Patent: Jan. 30, 2001

(54) APPARATUS AND METHOD FOR CONVERTING THE RESOLUTION AN IMAGE TO A RESOLUTION OF A LCD MONITOR

(75) Inventor: Joon-Woo Lim, Sungnam (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 09/197,690

(22) Filed: Nov. 23, 1998

(30) Foreign Application Priority Data

Nov. 21, 1997 (KR) .................................................. 97-61839

(51) Int. Cl.[7] .............................. G09G 3/36; G09G 5/37
(52) U.S. Cl. .............................. 345/132; 345/87; 345/88; 345/147; 345/154
(58) Field of Search .................................... 345/150, 151, 345/152, 153, 154, 155, 147, 89, 88, 87, 127, 3, 132; 348/433; 359/333; 358/1.2, 525; 382/276, 280

(56) References Cited

U.S. PATENT DOCUMENTS

| | | | | |
|---|---|---|---|---|
| 5,164,831 | * | 11/1992 | Kuchta et al. ........................ | 348/233 |
| 5,544,091 | * | 8/1996 | Watanabe ............................. | 708/400 |
| 5,694,141 | * | 12/1997 | Chee ..................................... | 345/1 |
| 5,754,165 | * | 5/1998 | Oyashiki et al. .................... | 345/154 |
| 5,790,096 | * | 8/1998 | Hill, Jr. ................................ | 345/150 |
| 5,821,913 | * | 10/1998 | Mamiya ................................ | 345/88 |
| 5,841,430 | * | 11/1998 | Kurikko ............................... | 345/213 |
| 5,861,869 | * | 1/1999 | Scheffer et al. ...................... | 345/147 |
| 6,005,690 | * | 12/1999 | Suzuki et al. ........................ | 358/527 |
| 6,028,585 | * | 2/2000 | Ishii et al. ............................ | 345/132 |
| 6,046,735 | * | 4/2000 | Bassetti et al. ...................... | 345/204 |
| 6,067,071 | * | 5/2000 | Kotha et al. ......................... | 345/132 |

* cited by examiner

Primary Examiner—Jeffery Brier
Assistant Examiner—Thu-Thao Hauan
(74) Attorney, Agent, or Firm—Robert E. Bushnell, Esq.

(57) ABSTRACT

An apparatus for converting resolution of an LCD is disclosed by which in case that a resolution of an image provided from an LCD monitor is low, it is converted according to a resolution of the LCD monitor by using a DCT (Discrete Cosine Transform) and an IDCT (Inverse Discrete Cosine Transform). The apparatus for converting resolution of an LCD monitor includes a computer for outputting color signals of R, G and B to be displayed on a screen of an LCD monitor and simultaneously outputting horizontal and vertical synchronous signals; a signal amplifying and adjusting unit for amplifying a level of the image signal input from the computer; a clamp for adjusting a brightness of the image signal provided from the signal amplifying and adjusting unit by varying its level in accordance with a brightness control signal; analog-to-digital converter for converting an analog signal provided from the clamp to a digital signal to output it; a microcomputer for detecting a horizontal/vertical synchronous signal provided from the computer to separate it, detecting a graphic display mode by using a frequency of the separated horizontal/vertical synchronous signal; and recognizing a resolution in accordance with the detected graphic display mode; and a graphic controller for discrete-cosine transforming and reversely converting the frequency of the image signal output from the analog-to-digital converter and applying it to the LCD panel in order to convert the resolution recognized by the microcomputer to a resolution suitable to a monitor of the LCD, by which in case that the resolution of the input image is low, it is converted to a resolution fitting the LCD monitor through the DCT and IDCT, thereby remarkably improving the picture quality.

7 Claims, 4 Drawing Sheets

APPARATUS AND METHOD FOR CONVERTING THE RESOLUTION AN IMAGE TO A RESOLUTION OF A LCD MONITOR

CLAIM OF PRIORITY

This application makes reference to, incorporates the same herein, and claims all benefits accruing under 35 U.S.C.§119 from an application entitled *An apparatus For Converting Resolution Of Monitor* earlier filed in the Korean Industrial Property Office on Nov. 21, 1997, and there duly assigned Ser. No. 97-61839 by that Office.

BACKGROUND OF THE INVENTION

1. Field of the Invention

The present invention relates in general to an apparatus for converting resolution of an LCD (Liquid Crystal Display) monitor, and more particularly to an apparatus for converting resolution of an LCD such that when a resolution of an image provided from an LCD monitor is low, it is converted according to a resolution of the LCD monitor by using a DCT (Discrete Cosine Transform) and an IDCT (Inverse Discrete Cosine Transform).

2. Description of the Prior Art

Generally, a LCD monitor has advantages in that it is light and can be made thin and an image is displayed usually clearly without distortion, so that its application is being extended for coverage including lap-top computers. Accordingly, it is necessary to convert the resolution of an image output from a computer the a resolution of the LCD monitor. When converting the resolution to that of the LCD monitor, a level of a color signal of predetermined R, G and B image signals provided from the computer to be displayed on a screen of the LCD monitor are amplified, brightness adjusted and converted to a digital signal. Then a microcomputer in the LCD monitor detects the operating mode of the computer by detecting the frequency of a horizontal synchronous signal and a vertical synchronous signal in order to recognize the image resolution. The resolution is recognizable because the frequencies between the horizontal synchronous signal and the vertical synchronous signal provided from various computers are different from each other according to the display graphics mode of the computer.

The computer may output the horizontal synchronous signal and the vertical synchronous signal in several ways that include separating to output the horizontal synchronous signal and the vertical synchronous signal; outputting a composite synchronous signals by mixing the horizontal synchronous signal and the vertical synchronous signal; or mixing and outputting the horizontal synchronous signal, vertical synchronous signal and R, G or B color signals.

The display graphics modes include: CGA (Color Graphics Adapter) mode; VGA (Video Graphics OuTay) mode; and SVGA (Super Video Graphics Array) mode. The frequency and resolution of the horizontal synchronous signal and the vertical synchronous signal are different for each of these modes. For example, in the CGA mode, a frequency of the horizontal synchronous signal is 15.75 KHz while that of vertical synchronous signal is 60 Hz and a resolution is 640×350. In the VGA mode, a frequency of the horizontal synchronous signal is 31.5 KHz while that of the vertical synchronous signal is 60 Hz or 70 Hz, and its resolution is 720×350 or 640×480. In the SVGA mode, a frequency of the horizontal synchronous signal is 35–37 KHz while that of the vertical synchronous signal V is interlaced, and its resolution is 800×600.

As described above, when the microcomputer recognizes the resolution according to the display graphics mode, the separated horizontal synchronous signal and the vertical synchronous signal are output to a graphic controller in the monitor. The graphic controller varies divided values of a PLL (Phase Locked Loop) circuit according to the resolution recognized by the microcomputer, and adjusts a frequency of a pulse signal applied to an LCD panel so as to control the display. The LCD panel may provide a resolution of 1024× 768. Thus, when an image with a resolution of 640×480 or 800×600 is applied, the graphic controller applies an artificial signal satisfying the resolution of 1024×768 to convert the image signal resolution to the resolution of 1024×768 and then outputs it to the LCD panel to be displayed. Namely, when an image with resolution of 640×480 is applied to an LCD panel with resolution of 1024×768, an actual picture through the LCD panel is converted to the resolution of 1024×768 through a resolution adjusting unit. In order to display the input image, additional pixels are inserted by the resolution adjusting unit, which has bad influence on the picture quality to be actually displayed. Therefore, in the conventional apparatus for converting resolution in a LCD monitor, when an image with a resolution of 640×480 or 800×600 is applied, this applied signal is converted to resolution of 1024×768 by simply fitting the size of the image to the LCD panel, thus the picture to be displayed is not clear.

SUMMARY OF THE INVENTION

An object of the present invention is to provide an apparatus for converting the resolution of an image input to an LCD monitor to the resolution of the LCD monitor such that the frequency of the input image is discrete-cosine transformed and reversely converted to convert it to the resolution provided by the LCD monitor so as to be clearly displayed on a LCD panel.

In order to attain the above object, there is provided an apparatus for converting resolution of an LCD monitor including a computer for outputting R, G and B color signals to be displayed on a screen of an LCD monitor and simultaneously outputting horizontal and a vertical synchronous signals; a signal amplifying and adjusting unit for amplifying a level of the image signal input from the computer; a clamp for adjusting a brightness of the image signal provided from the signal amplifying and adjusting unit by varying its level in accordance with a brightness control signal; an analog-to-digital converter for converting an analog signal provided from the clamp to a digital signal to output it; a microcomputer for detecting a synchronous signal provided from the computer to separate the horizontal and vertical synchronous signals, detecting a graphic display mode by using frequencies of the separated horizontal and vertical synchronous signals, and recognizing a resolution in accordance with the detected graphic display mode; and a graphic controller for discrete-cosine transforming and inverse discrete-cosine transforming the frequency of the image signal output from the analog-to-digital converter and applying it to the LCD panel in order to convert the resolution recognized by the microcomputer to a resolution suitable to a monitor of the LCD.

Additionally, there is provided a method for converting the resolution of an image input to an LCD monitor from a computer outputting R, G and B color signals to be displayed on a screen of the LCD monitor and simultaneously outputting horizontal and a vertical synchronous signals having the steps of: amplifying a level of the image signal input from the computer; adjusting a brightness of the amplified image signal by varying its level in accordance with a brightness control signal; converting brightness adjusted signal to a digital signal to output it to a microcomputer; detecting a synchronous signal provided from the computer and separating the horizontal and vertical synchronous signals; detecting a graphic display mode by using frequencies of the separated horizontal and vertical synchronous signals; recognizing a resolution of the image signal in accordance with the detected graphic display mode; discrete-cosine transforming and inverse discrete-cosine transforming the frequency of the digital image signal and applying it to the LCD panel in order to convert the resolution recognized by the microcomputer to a resolution suitable for the monitor of the LCD.

Additional advantages, objects and other features of the invention will be set forth in part in the description which follows and in part will become apparent to those having ordinary skill in the art upon examination of the following or may be learned from practice of the invention. The object and advantages of the invention may be realized and attained as particularly pointed out in the appended claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DETAILED DESCRIPTION OF THE INVENTION

A preferred embodiment of the present invention will now be described with reference to the accompanying drawings.

Figure 1:
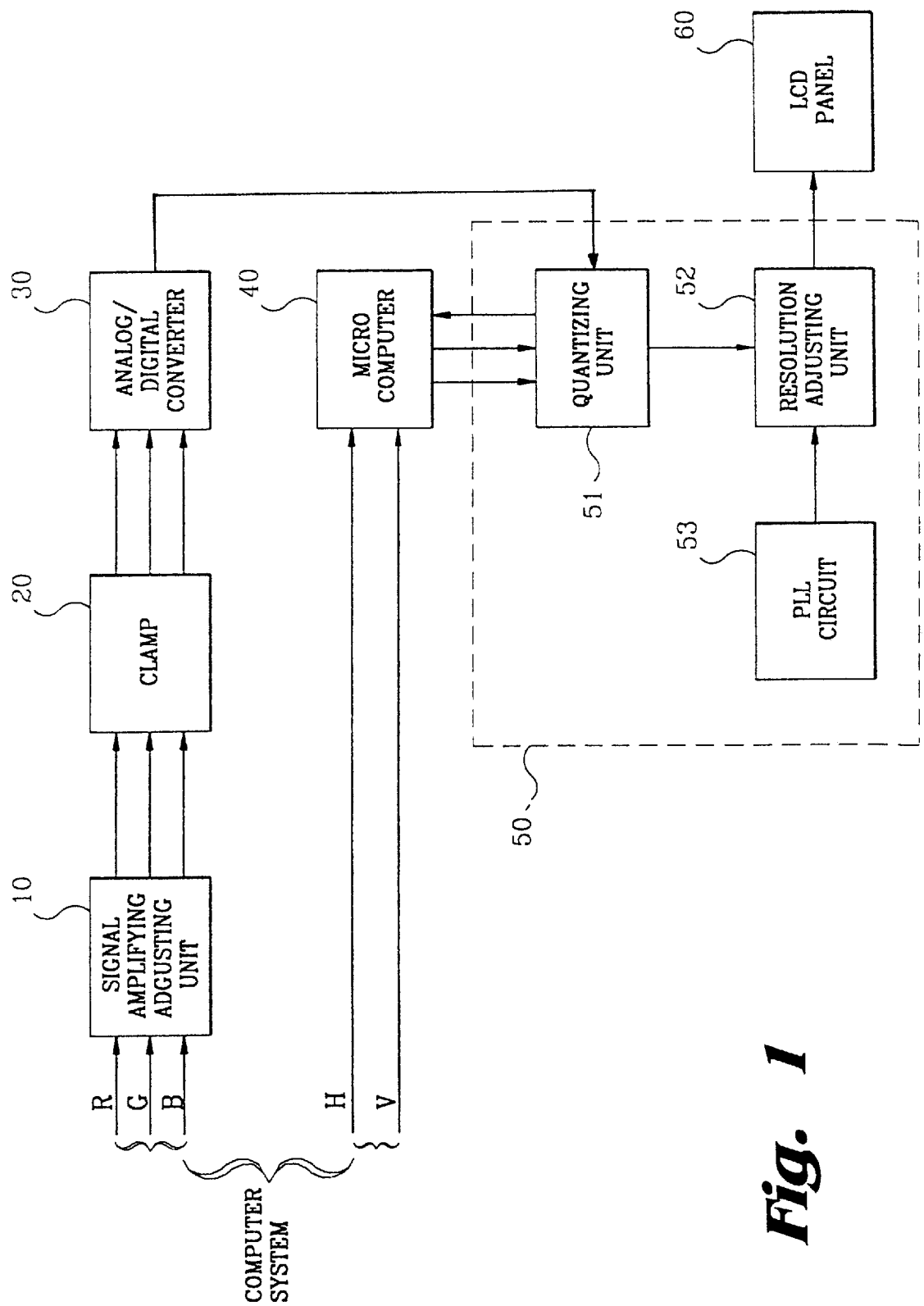
FIG. 1 is a schematic block diagram showing an exemplary apparatus for converting the resolution of an image according to the resolution of a LCD monitor.

In FIG. 1 a block diagram of an apparatus for converting resolution of a conventional LCD monitor is shown having a signal amplifying and adjusting unit 10 which amplifies a level of a color signal of predetermined R, G and B image signals to be displayed on a screen of the LCD monitor which are provided from a computer. A clamp 20 adjusts a brightness by varying an image signal provided from signal amplifying and adjusting unit 10 according to a brightness control signal. An analog-to-digital converter 30 converts the analog amplified signal provided from clamp 20 to a digital image signal. A microcomputer 40 controls an overall operation of the LCD monitor.

Namely, the microcomputer 40 detects a horizontal synchronous signal H and a vertical synchronous signal V provided from the computer. The computer may output the horizontal synchronous signal H and the vertical synchronous signal V in several ways that include separating to output the horizontal synchronous signal H and the vertical synchronous signal V; outputting a composite synchronous signals by mixing the horizontal synchronous signal H and the vertical synchronous signal V; or mixing and outputting the horizontal synchronous signal H, a vertical synchronous signal V and R, G or B color signals. Likewise, the microcomputer 40 detects the horizontal synchronous signal H and the vertical synchronous signal V which are input from the computer through various ways. The microcomputer 40 detects the graphic display mode by means of the frequency of the horizontal synchronous signal H and the vertical synchronous signal V, and recognizes the resolution, accordingly. The resolution is recognizable because the frequencies between the horizontal synchronous signal H and the vertical synchronous signal V provided from the computer are different to each other according to each graphic display mode.

As described above, when the microcomputer 40 recognizes the resolution according to the graphic display mode, the separated horizontal synchronous signal H and the vertical synchronous signal V are output to a graphic controller 50. The graphic controller 50 varies divided values of a PLL (Phase Locked Loop) circuit 53 according to the resolution recognized by the microcomputer 40, adjusts a frequency of an output pulse signal to apply it to an LCD panel 60 so as to be displayed. The graphic controller 50 includes a quantizing unit 51 for quantizing the digital image signal output from the analog-to-digital converter 30, and a resolution adjusting unit 52 for adjusting a resolution of the image represented by the quantized data output from the quantizing unit 51.

Figure 2:
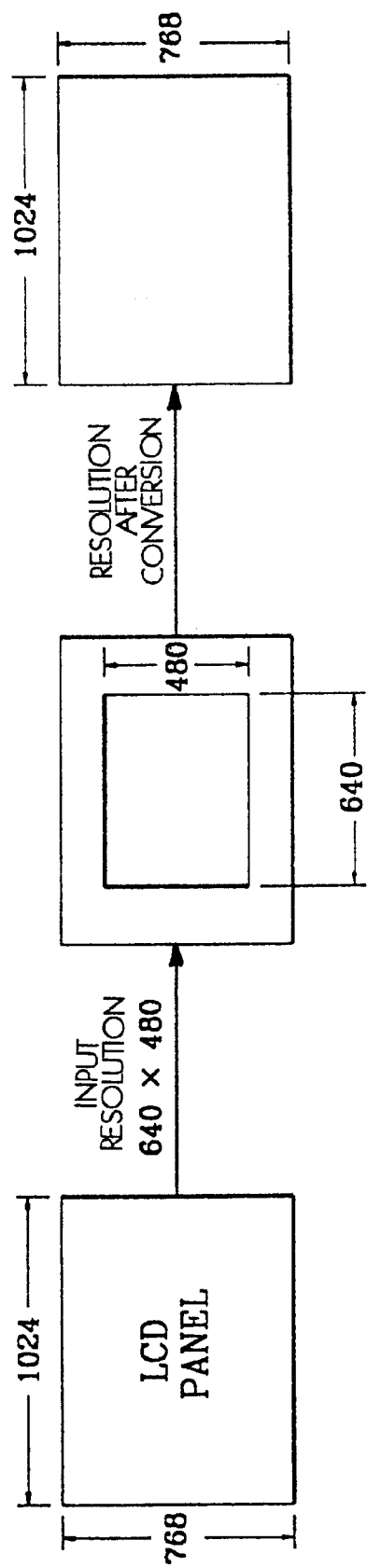
FIG. 2 is a schematic block diagram showing an operation of the resolution conversion in accordance with FIG. 1.

As to the LCD monitor with the above construction, LCD panel 60 provides a resolution of 1024×768. Thus, when an image with a resolution of 640×480 or 800×600 is applied, the graphic controller 50 applies an artificial signal satisfying the resolution of 1024×768 to convert it to the resolution of 1024×768 and then outputs it to the LCD panel 60 to be displayed. Namely, as shown in FIG. 2, for example, when an image with resolution of 640×480 is applied to the LCD panel 60 with resolution of 1024×768, an actual picture through the LCD panel 60 is displayed with size of 640×480 at a central partial region, not the whole part of the LCD panel 60. However, when the image is converted to the resolution of 1024×768 through the resolution adjusting unit 52, in order to display the input image to the LCD panel 60, pixels of 1024−640=384 in number and lines of 768−480= 288 in number are to be additionally inserted, which has a bad influence on the picture quality to be actually displayed.

Therefore, in the apparatus of FIG. 1, when an image with resolution of 640×480 or 800×600 is applied, since this applied signal is quantized and converted to a resolution of 1024×768 for simply fitting the size of the LCD panel, the picture to be displayed through the LCD is not clear.

Figure 3:
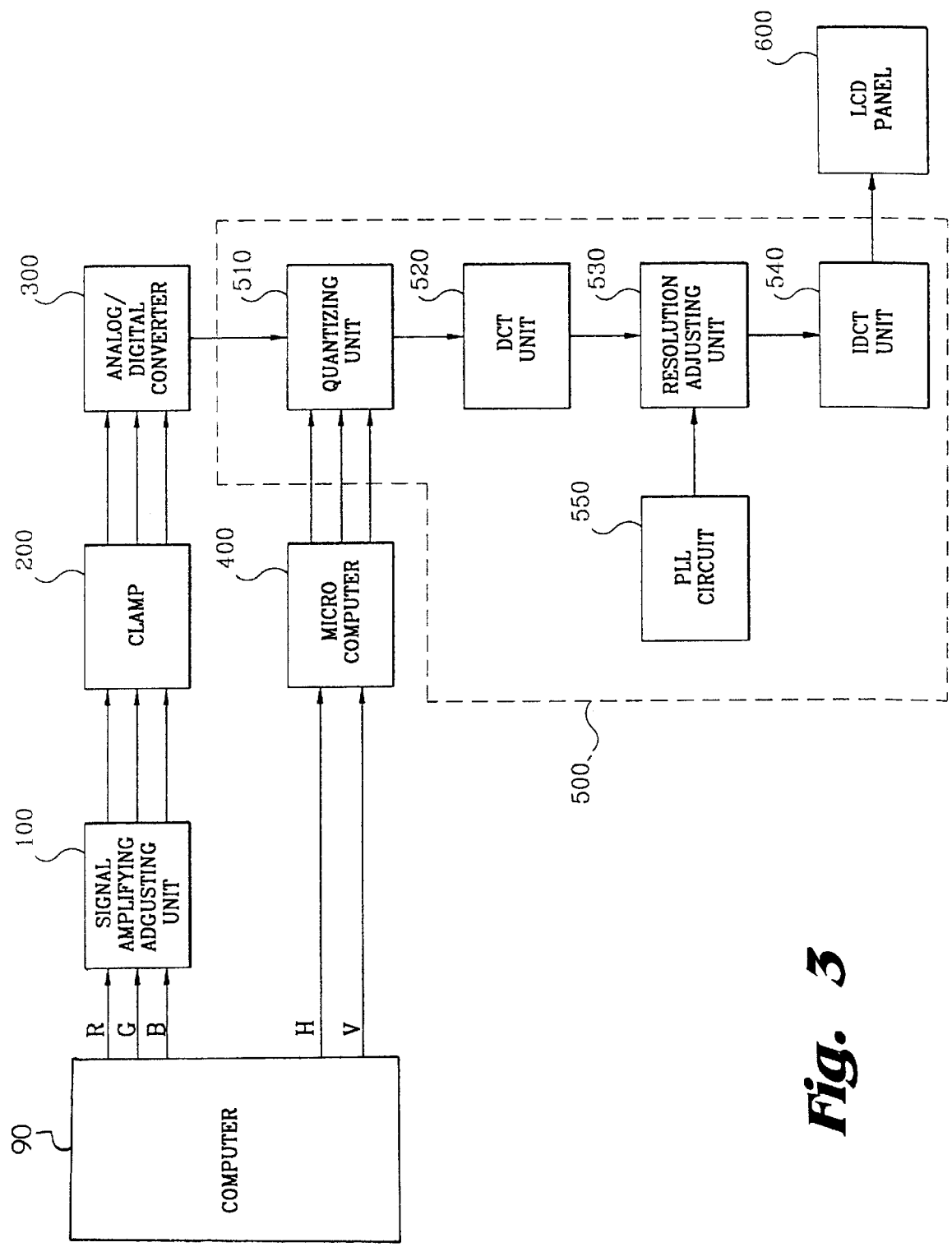
FIG. 3 is a schematic block diagram of an apparatus for converting the resolution of an image to the resolution of a LCD monitor in accordance with the principles of the present invention.

FIG. 3 is a schematic block diagram of an apparatus for converting resolution of an LCD monitor in accordance with the present invention. As shown in this drawing, a signal amplifying and adjusting unit 100 amplifies the levels of the R, G and B color components of an image signal provided from a computer 90 to be displayed on a screen of an LCD panel 600. A clamp 200 controls brightness by varying the levels of the image signal provided from the signal amplifying and adjusting unit 100 in accordance with a brightness control signal. An analog-to-digital converter 300 converts the analog signal provided from the clamp 200 to a digital image signal.

A microcomputer 400 controls the general operation of the LCD monitor. Namely, the microcomputer 400 detects and/or separates the horizontal synchronous signal H and the vertical synchronous signal V provided from the computer 90, detects a graphic display mode by using the frequency of the horizontal synchronous signal H and the vertical synchronous signal V, and recognizes the resolution in accordance with the detected graphic display mode. When the microcomputer 400 recognizes the resolution, the horizontal synchronous signal H and the vertical synchronous signal V are output to a graphic controller 500.

Graphic controller 500 varies the divided value of a PLL circuit 550 in accordance with the resolution recognized by microcomputer 400, and converts the frequency of the output image signal to a resolution suitable of the LCD monitor by using a discrete-cosine transformation and an inverse discrete-cosine transformation, and then applies the resolution converted image to LCD panel 600 to be displayed.

The graphic controller 500 includes: a quantizer 510 for quantizing the digital image signal output from the analog-to-digital converter 300; a DCT unit 520 for dividing the data quantized by the quantizer 510 into blocks and converting it; resolution adjusting unit 530 for controlling the DCT coefficient for each block generated as a result of the conversion of the DCT unit 520 and adjusting it to the resolution provided by the LCD monitor; and an IDCT unit 540 for reversely converting the date input from the resolution adjusting unit 530 and restoring it to an original picture with a resolution corresponding to the resolution of the screen of the LCD panel 600.

Figure 4:
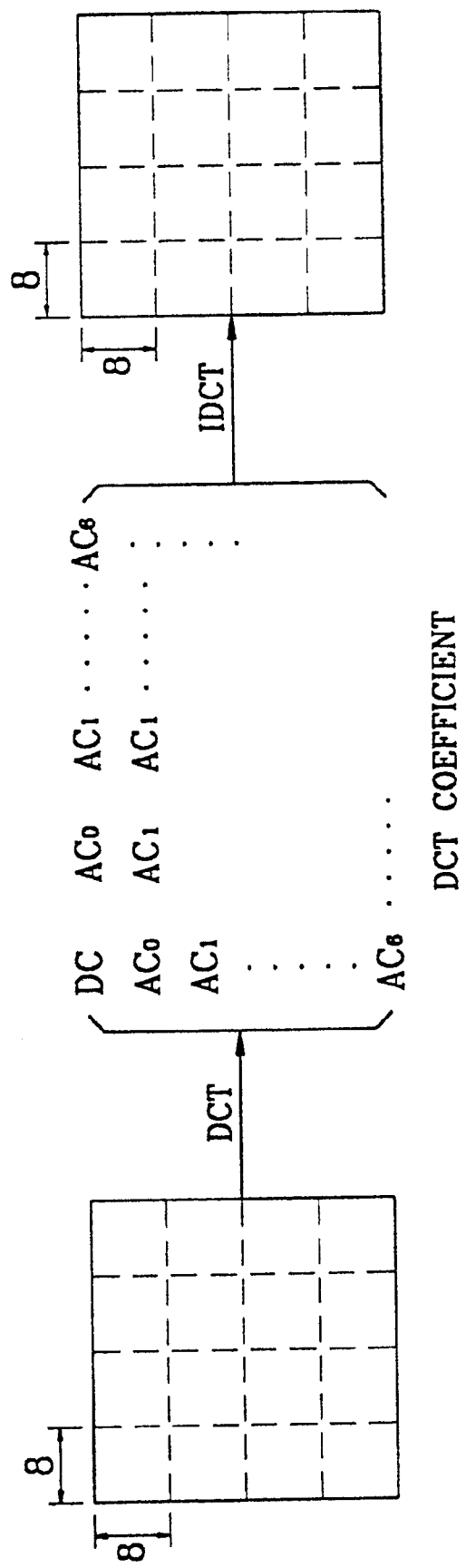
FIG. 4 is a explanatory diagram representing DCT conversion and IDCT conversion adapted to the present invention.

FIG. 4 is a explanatory diagram representing DCT conversion and IDCT conversion adapted to the present invention. As shown in this drawing, when discrete-cosine transforming the first applied digital picture, the image is divided into 8×8 blocks and operation is performed according to an Equation 1,as shown in below. In addition to normal image division by 8×8 blocks, the image can also be divided by 4×4 blocks or 2×2 blocks. Equation 1:

$$f(x, y) = \sum_{u=0}^{N-1} \sum_{v=0}^{N-1} a(u)a(v)C(u, v)\cos\left[\frac{(2x+1)u\pi}{2N}\right]\cos\left[\frac{(2y+1)v\pi}{2N}\right] \quad (1)$$

where, u, v=0, 1, 2, . . . N−1.

By performing the DCT as shown in Equation 1, the DCT coefficients for each 8×8 blocks are obtained. In this respect, the direct current (DC) component denotes an average value of the overall picture, and the alternating current (AC) components denote a variation of each picture. Likewise, after obtaining the DCT coefficients, when the image is restored by performing IDCT, there can be obtained an image which is almost the same as the original picture.

As to the most spatial frequency distributions representing high definition of natural image, since a low frequency component is large while a high frequency component is small, the DCT utilizing such spatial frequency distribution is used to compress the image. Accordingly, when the image is compressed by the DCT, compressibility is so excellent that the data to be transmitted is much decreased and the compressed image can be restored almost the same as the original image.

An operation of the apparatus for converting the resolution of the LCD monitor as constructed above in accordance with the present invention will now be described.

Assuming that the resolution of the image applied from the computer 90 is 640×480. First, R, G and B color signals of the predetermined image signal to be displayed on the screen of the LCD monitor are output and simultaneously the horizontal synchronous signal H and the vertical synchronous signal V are output from the computer 90.

The level of image signal supplied by the computer 90 is amplified by the signal amplifying and adjusting unit 100, the level of the input image signal input from the signal amplifying and adjusting unit 100 is varied by the clamp 200, to thereby adjust the brightness. The analog signal output from the clamp 200 is converted to a digital signal through the analog-to-digital converter 300 and is output to the graphic controller 500.

The horizontal synchronous signal H and the vertical synchronous signal V output from the computer 90 are detected, and separated if necessary, by the microcomputer 400; and the graphic display mode and the resolution of the input image are recognized by using the frequency of the detected horizontal synchronous signal H and vertical synchronous signal V. As the microcomputer 400 recognizes the resolution according to the graphic display mode, the separated horizontal synchronous signal H and the vertical synchronous signal V are output to graphic controller 500.

According to the resolution recognized by microcomputer 400, graphic controller 500 quantizes the image signal output from analog-to-digital converter 300 through quantizer 510. Thus quantized data is divided into blocks of 8×8 in number and then converted by DCT unit 520, thereby obtaining DCT coefficient corresponding to each block. As to the DCT coefficients obtained by the conversion in DCT unit 520, suitable values are applied for each of the coefficients so that they fit the resolution of 1024×768 provided by the LCD monitor through the resolution adjusting unit 530. The data output from resolution adjusting unit 530 is inversely converted by IDCT unit 540 so that a converted picture of 1024×768 is obtained from the original image of 640×480 which was initially applied and thus restored image is applied to LCD panel 600 to be displayed.

In this regard, the information of a digital picture is analyzed in the frequency area and the resolution of the applied image is converted, which, doubtless, also can be extensively applied to contour correction or image compression.

As so far described, the apparatus converts the resolution of an image according to the resolution of a LCD monitor of the present invention, when the resolution of the image input to the LCD monitor is lower than the resolution of the LCD monitor, utilizing the frequency of the input image, DCT and IDCT, unlike the known art where pixels and lines are forcefully inserted for conversion to a resolution of 1024× 786, so that the image can be displayed on the LCD panel with remarkably improved picture quality.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for converting resolution of an image for display on a liquid crystal display monitor, comprising:

a computer for outputting an image signal as R, G and B color signals to be displayed on a screen of a liquid crystal display monitor and simultaneously outputting a horizontal synchronous signal and a vertical synchronous signal;

a signal amplifying and adjusting unit for generating an amplified image signal by amplifying a level of the image signal output from the computer;

a clamp for generating an analog brightness adjusted image signal by adjusting a brightness of the amplified image signal in accordance with a brightness control signal to vary its level;

an analog-to-digital converter for outputting a digital image signal by converting the analog brightness adjusted image signal provided from the clamp;

a microcomputer for detecting the horizontal and vertical synchronous signals provided from the computer, detecting a graphic display mode by using a frequency of the horizontal synchronous signal and a frequency of the vertical synchronous signal and recognizing a resolution if said image signal in accordance with the detected graphic display mode; and a graphic controller for discrete-cosine transforming and inverse discrete-cosine transforming the frequency of the digital image signal output from the analog-to-digital converter in order to convert the resolution recognized by the microcomputer to a resolution of said liquid crystal display monitor.

2. The apparatus as claimed in claim 1, wherein the graphic controller comprises:

a quantizer for quantizing the digital image signal output from the analog-to-digital converter;

a discrete cosine transforming unit for dividing quantized data output from said quantizer into a plurality blocks and converting it;

a resolution adjusting unit for controlling a coefficient for each of said block generated as a result of the conversion of the discrete cosine transforming unit and adjusting it to the resolution of the liquid crystal display monitor; and an inverse discrete cosine transforming unit for inversely converting the data input from the resolution adjusting unit and restoring it to an original picture.

3. The apparatus as set forth in claim 1, wherein said microcomputer separates said horizontal synchronous signal from said vertical synchronous signal when said computer outputs a composite synchronous signal including said horizontal synchronous signal and said vertical synchronous signal.

4. A method for converting the resolution of an image input to an liquid crystal display monitor from a computer outputting R, G and B color signals to be displayed on a screen of the liquid crystal display monitor and simultaneously outputting horizontal and a vertical synchronous signals, said method comprising steps of:

amplifying a level of the image signal input from the computer;

adjusting a brightness of the amplified image signal by varying its level in accordance with a brightness control signal;

converting brightness adjusted signal to a digital image signal;

detecting the horizontal and vertical synchronous signals;

detecting a graphic display mode by using frequencies of the separated horizontal and vertical synchronous signals;

recognizing a resolution of the image signal in accordance with the detected graphic display mode;

discrete-cosine transforming and inverse discrete-cosine transforming the frequency of the digital image signal and applying it to the liquid crystal display panel in order to convert the recognized resolution to a resolution suitable for the monitor of the liquid crystal display.

5. The method as set forth in claim 4, further comprising a step of quantizing said digital image signal prior to performing said step of discrete-cosine transforming.

6. The method as set forth in claim 4, said step of discrete-cosine transforming comprising dividing said digital image signal into a plurality of blocks according to the following equation:

$$f(x, y) = \sum_{u=0}^{N-1} \sum_{v=0}^{N-1} a(u)a(v)C(u, v)\cos\left[\frac{(2x+1)u\pi}{2N}\right]\cos\left[\frac{(2y+1)v\pi}{2N}\right] \quad (1)$$

wherein, u, v=0, 1, 2, . . . N−1.

7. The method as set forth in claim 4, further comprising a step of adjusting discrete-cosine transform coefficients obtained by said step of discrete-cosine transforming prior to performing said inverse discrete-cosine transforming.

* * * * *